Patented Jan. 19, 1926.

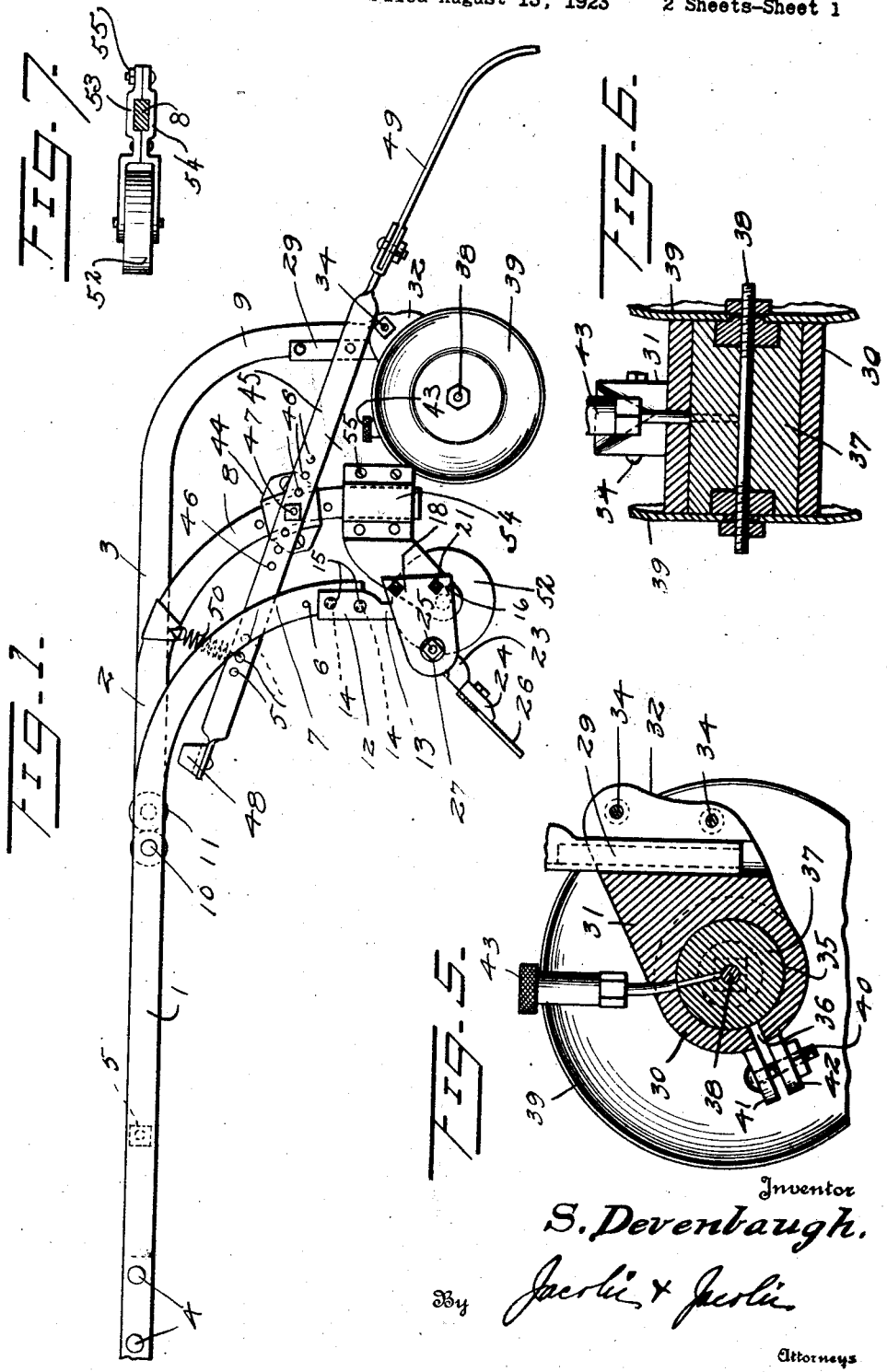

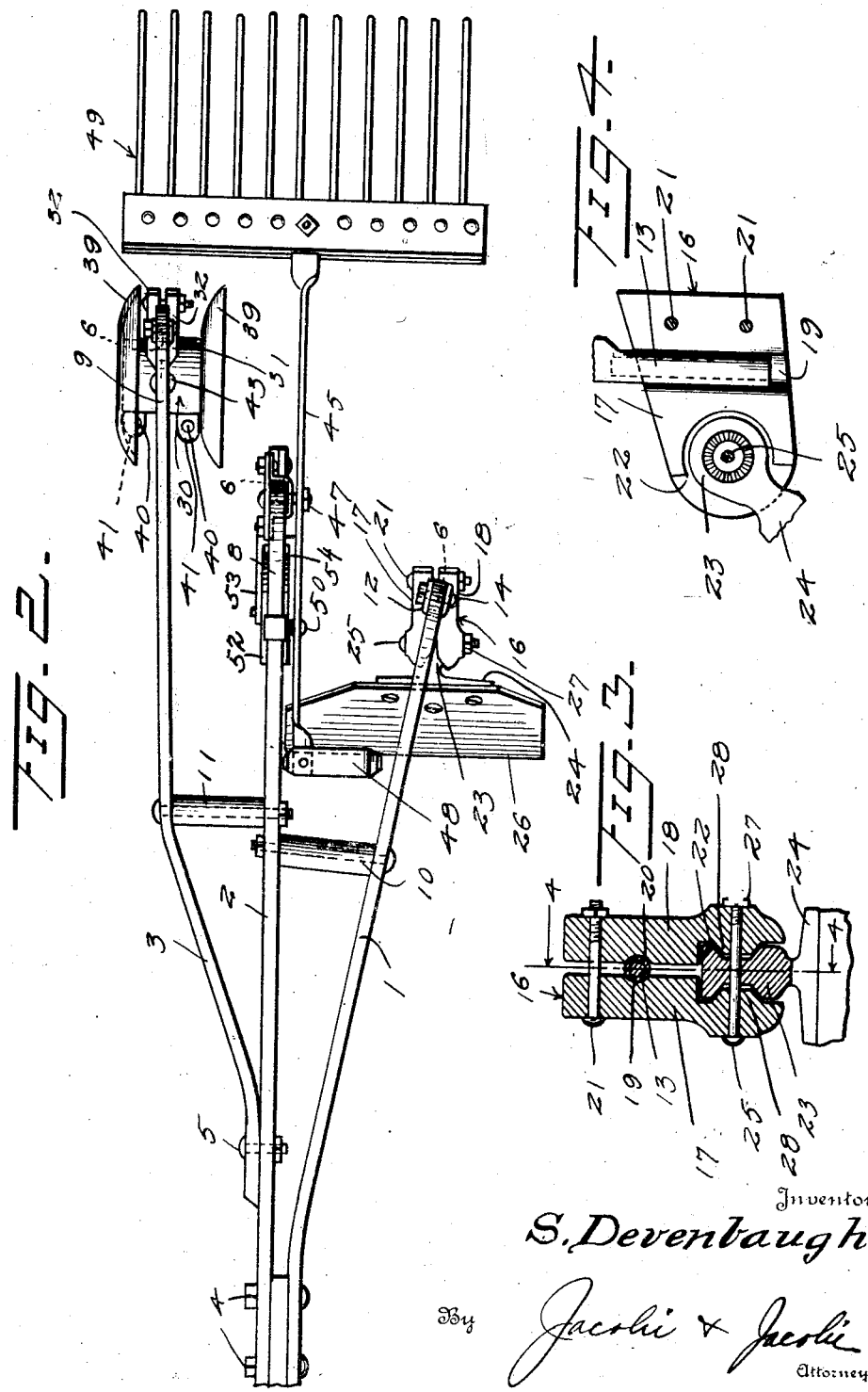

1,570,132

UNITED STATES PATENT OFFICE.

SAMUEL DEVENBAUGH, OF LAGRANGE, INDIANA.

CULTIVATOR ATTACHMENT.

Application filed August 13, 1923. Serial No. 657,124.

*To all whom it may concern:*

Be it known that SAMUEL DEVENBAUGH, a citizen of the United States, residing at Lagrange, in the county of Lagrange and State of Indiana, has invented certain new and useful Improvements in Cultivator Attachments, of which the following is a specification.

This invention relates to new and useful improvements in cultivator attachments and has for its principal object to provide a rake in connection with the rotary disk mounted upon a cultivator whereby the ground over which the cultivator is adapted to travel will be free of any growing weeds and will be furthermore put in condition for planting.

Another important object of the invention is to provide a cultivator attachment, wherein the rake is adapted to be automatically lifted out of engagement with the ground when the same comes in contact with any obstruction such as a stone or the like, and which would result in the damaging of the rake.

A still further object of the invention is to provide a device of the above mentioned character wherein the rake is provided with means for normally maintaining the same in engagement with the ground and which is furthermore provided with an extension at its forward end for manually raising the rake out of normal operative position whenever it is desired.

A still further object of the invention is to provide a device of the above mentioned character wherein the rake attachment is adapted for adjustably and detachably supporting the same.

Other objects and advantages of this invention will become apparent during the course of the following description.

In the accompanying drawings, wherein for the purpose of illustration is shown the preferred embodiment of my invention, and wherein like numerals indicate like parts through the same, Figure 1 is a side elevation showing my various attachments in their operative position, Figure 2 is a top plan view thereof, Figure 3 is a horizontal sectional view through the head member carrying the scraper blade.

Figure 4 is a section on the line 4—4 of Fig. 3.

Figure 5 is a vertical sectional view through the disc supporting member.

Figure 6 is a vertical sectional view taken at right angles to the plane of Fig. 5.

Figure 7 is a transverse section taken through the lower end of the intermediate curved arm 8.

The numerals 1, 2 and 3 designate the supporting beams and which diverge from their forward end as more clearly shown in Fig. 2 of the drawings. For the purpose of convenience the supporting beams designated by the numerals 1 and 3 are termed the outer beams, and the other supporting beam 2 is designated the intermediate or central beam. These beams are secured together in the manner more clearly shown in Fig. 2 of the drawings wherein the beam 1 is secured to the intermediate beam 2 at their forward ends by any suitable fastening means such as is shown at 4 in the drawings, and the outer beam 3 is secured at its forward end to the intermediate beam 2 as shown at 5 in the drawings.

The beams 1, 2 and 3 respectively have their outer free ends curved downwardly to provide supporting arms, and these supporting arms are provided with spaced apertures 6 in the lower portions thereof. As is shown in Fig. 1 of the drawings, the curved arm 7 of the beam 1 extends slightly forward of the curved arm 8 of the beam 2 and the latter is located forwardly of the curved arm 9 of the beam 3 for the purpose to be hereinafter more fully described. These beams 1, 2 and 3 respectively are furthermore held in spaced relation by means of the spacing elements 10 and 11 supported between the beams adjacent the curved arms thereof.

These beams 1, 2 and 3 respectively are secured in a suitable manner to the riding cultivator of the well known construction, and it is not thought necessary to further go into detail as to the construction of the riding cultivator to which my invention is attached as the same does not form any important feature of my invention.

Secured to the lower free end of the curved arm 7 of the outer beam is the channeled portion 12 of the tubular sleeve 13. This tubular sleeve 13 and the channeled portion 12 formed upon the upper end thereof are formed of suitable metallic material and the channeled portion 12 is provided with registering apertures 14 in the sides thereof and which are furthermore adapted to co-operate with the apertures 6 provided in the lower portion of the arm 7 to receive the bolt 15 in order to support the sleeve 13 in position on the lower end of the curved arm 7. The sleeve 13 is furthermore adapted to receive a reinforcing rod therein for the purpose of permitting the sleeve to maintain its proper shape.

Adapted to be mounted upon the tubular sleeve 13 is the head member designated generally by the numeral 16 and which comprises a pair of complementary sections 17 and 18 respectively, the latter being provided with longitudinally extending grooves 19 and 20 in their inner faces for receiving the tubular sleeve 13 and are also provided with cut out portions adjacent their forward ends to provide a socket. The sections 17 and 18 are held in proper supported position on the tubular sleeve 13 by means of the transversely extending bolts 21 and adapted to be pivotally supported in the sockets 22 provided in the forward end of the head member 16 is the headed extension 23 which extends from the supporting plate 24. This headed extension 23 is pivotally supported in the socket 22 on the transversely extending bolt 25 which extends through the sections 17 and 18 respectively. This supporting plate 24 is adapted to be attached to the cutter blade 26 in any suitable manner and for the purpose of holding the cutter blade 26 in its various adjusted positions with respect to its supporting head 16, a suitable nut 27 is adapted to be threaded upon the threaded end of the bolt 25 whereby the enlarged head portion 23 may be prevented from accidental movement on the bolt 25 after the cutter blade 26 has been once set in adjusted position.

As a further means for holding the cutter blade 26 in its adjusted position with respect to the head 16 the sections 17 and 18 may be provided with corrugated cones such as shown at 28 in the drawings and which are preferably formed on the inner side walls of the sections and extend into the sockets formed at the forward portion of the head 16. To co-act with these corrugated cones the enlarged head portion 23 is adapted to have corrugated conical seats formed around the transversely extending opening formed therein which is adapted to receive the bolt 25 and the cones will fit in these corrugated seats and furthermore aid in holding the cutter blade 26 in its adjusted position.

A similar sleeve and channel portion are provided and adjustably mounted upon the lower end of the curved arm 9 forming a part of the outer beam 3 and this sleeve is designated by the numeral 29 in the drawings. Adapted to be adjustably supported upon the sleeve 29 is the housing designated generally by the numeral 30 and which is provided with an extension 31 in its rear portion, the extension being bifurcated to provide a means for enabling the extension to be received upon the sleeve 29 and the bifurcated ends 32 and 33 of the extension 31 are secured together by means of the transverse bolts 34. It being further understood that an enlarged bore is formed at the inner portion of the bifurcation in order to permit the same to readily fit around the sleeve 29. The housing 31 is furthermore provided with an enlarged transversely extending bore 35 and is also split as shown at 36 in the drawings to provide a means for detachably permitting the same to be placed around a bushing 37 in which is mounted the axle 38. On the outer ends of this axle 38 are mounted the rotary disks 39 and the bushing 37 is held in the enlarged bore 35 by means of the clamping bolts 40 which extends through suitable apertured lugs 41 and 42 provided adjacent the split portion of the housing, in the manner more clearly shown in the drawings. A suitable lubricating device designated by the numeral 43 is adapted to be mounted on the housing 30 whereby a lubricant may be supplied to the revolving member mounted in the enlarged bore 35.

Adjustably mounted upon the curved arm 8 of the intermediate beam 2 is the clamping member 44. This clamping member is adapted to pivotally support thereon the intermediate portion of an elongated arm 45. This arm 45 may be furthermore provided at its intermediate portion with spaced apertures 46 for pivotally supporting the same upon the bolt 47 carried by the clamping plate 44 in the manner as more clearly shown in the drawings. The forward end of the arm 45 is provided with a transversely extending portion 48 which provides a foot actuating member for the purpose to be hereinafter more fully described.

The foot actuating member 48 is so mounted upon the upper forward end of the arm 45 as to extend between the intermediate beam 2 and the outer beam 1 and within easy reach of the operator of the cultivator. The opposite end of the arm 45 is secured to a rake designated by the numeral 49 and this rake 49 is adapted to have its teeth normally in engagement with the ground at all times. For the purpose of normally holding the teeth of the rake in engagement with the ground a suitable coil spring 50 is connected at one end to the intermediate beam 2 adjacent the curved portion thereof, and the opposite end of the coil spring is connected to the arm 45 it being adapted to have its connecting ends with respect to the arm 45 disposed in suitable apertures 51 provided in the arm 45 for that particular purpose. The coil spring 50 normally causes the upper end of the arm 45 to be inclined upwardly and the teeth of the rake in engagement with the ground.

As seen in Fig. 1 of the drawings, the cutter blade 26 is disposed forwardly of the rotary disk 39 and the rake 49 extends in the rear of both the cutter blade and the rotary disk. In this manner when the cultivator is travelling over the ground to be prepared for planting the cutter blade 26 will first come in contact with all growing weeds and will cut the same down, and at the same time the rotary disk 39 will break up the earth and the rake 49 will smooth the lumps of broken earth after the rotary disks have turned the earth up into small clods. If the rake 49 should strike a rock or other obstruction the same will be allowed to move upwardly on its pivotal support 47 and against the tension of the coil spring 50 and after the same has passed such obstruction the coil spring 50 will again return the rake to its normal position whereby the same will be again in engagement with the ground. The purpose of the foot lever 48 to enable the rake to be disengaged from the ground whenever it is desired not to use the same and this may be easily done by the person sitting upon the riding cultivator to which my attachment is applied.

If desired the cutter blade may be removed or otherwise adjusted so as to place the same into an inoperative position when it is only desired to use the rotary disks and vice versa. This construction thereby enables each element to be used individually or in combination with each other as the case necessitates.

The simplicity of my device enables the same to be readily placed in operative position and it will perform simultaneously all of the operations which have heretofore been performed independently of each other and singularly. Furthermore by combining the various elements in a single device and mounting the same in the manner as heretofore described, each of the elements will properly perform its function at the desired time and will produce the necessary results.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to without departing from the spirit or sacrificing any of the principles of the invention.

I claim:

1. An attachment for agricultural machines comprising in combination with the frame, a beam having a rearwardly and downwardly curved extension, a land wheel adjustably mounted on the lower end of said curved extension, a rake arm pivoted upon said extension to swing in a vertical plane, means for adjusting the pivot point of said arm longitudinally thereof, a rake carried on the rear end of said arm, and means for yieldingly maintaining said rake in engagement with the ground in the rear of said machine.

2. An attachment for agricultural machines comprising a beam having a rearwardly and downwardly curved extension, a land wheel mounted on the lower end of said extension, a rake arm pivoted on said extension, means for adjusting the pivotal point of said arm longitudinally thereof, means for vertically adjusting the pivotal point of said arm on the extension of said beam, a rake mounted on the rear end of said rake arm, and means for yieldingly maintaining said rake in engagement with the ground at the rear of the machine.

In testimony whereof I affix my signature.

SAMUEL DEVENBAUGH.